June 18, 1963 — J. S. REID — 3,093,846
WINDSHIELD OPERATING MECHANISM
Filed March 28, 1961 — 4 Sheets-Sheet 1

INVENTOR.
JAMES S. REID
BY Meyer, Baldwin, Doran & Young
ATTORNEYS

June 18, 1963 J. S. REID 3,093,846
WINDSHIELD OPERATING MECHANISM
Filed March 28, 1961 4 Sheets-Sheet 2
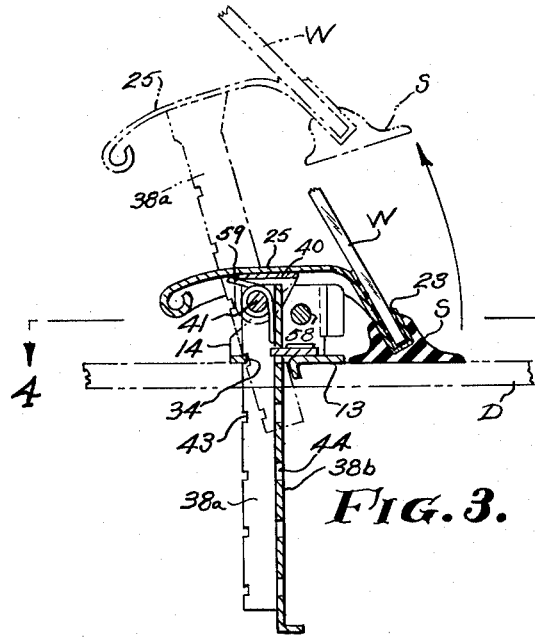
FIG. 3.
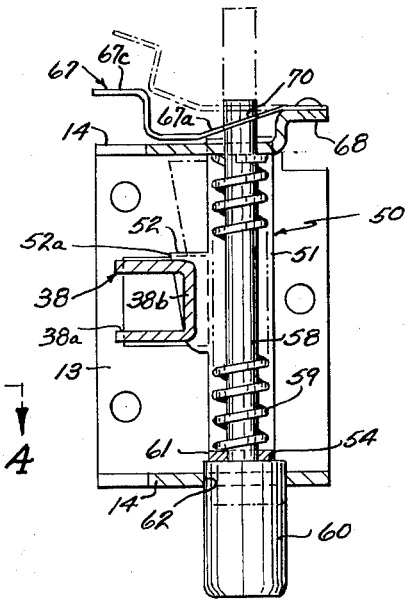
FIG. 4.
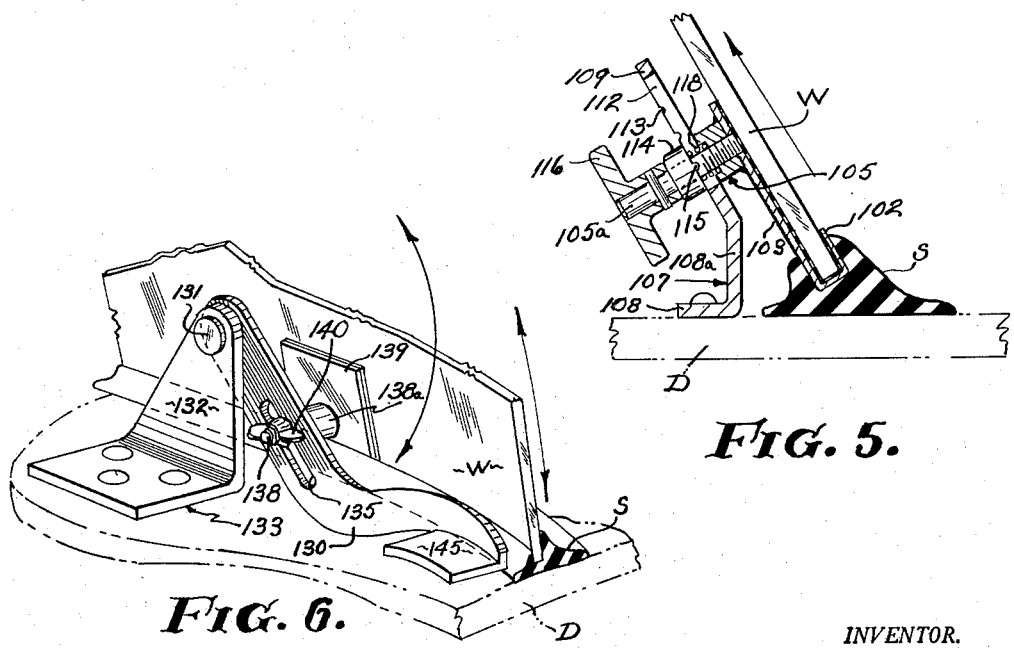
FIG. 5.
FIG. 6.
INVENTOR.
JAMES S. REID
BY
Meyer, Baldwin, Doran & Young
ATTORNEYS June 18, 1963 J. S. REID 3,093,846
WINDSHIELD OPERATING MECHANISM
Filed March 28, 1961 4 Sheets-Sheet 3

INVENTOR.
JAMES S. REID
BY
Meyer, Baldwin, Doran & Young
ATTORNEYS

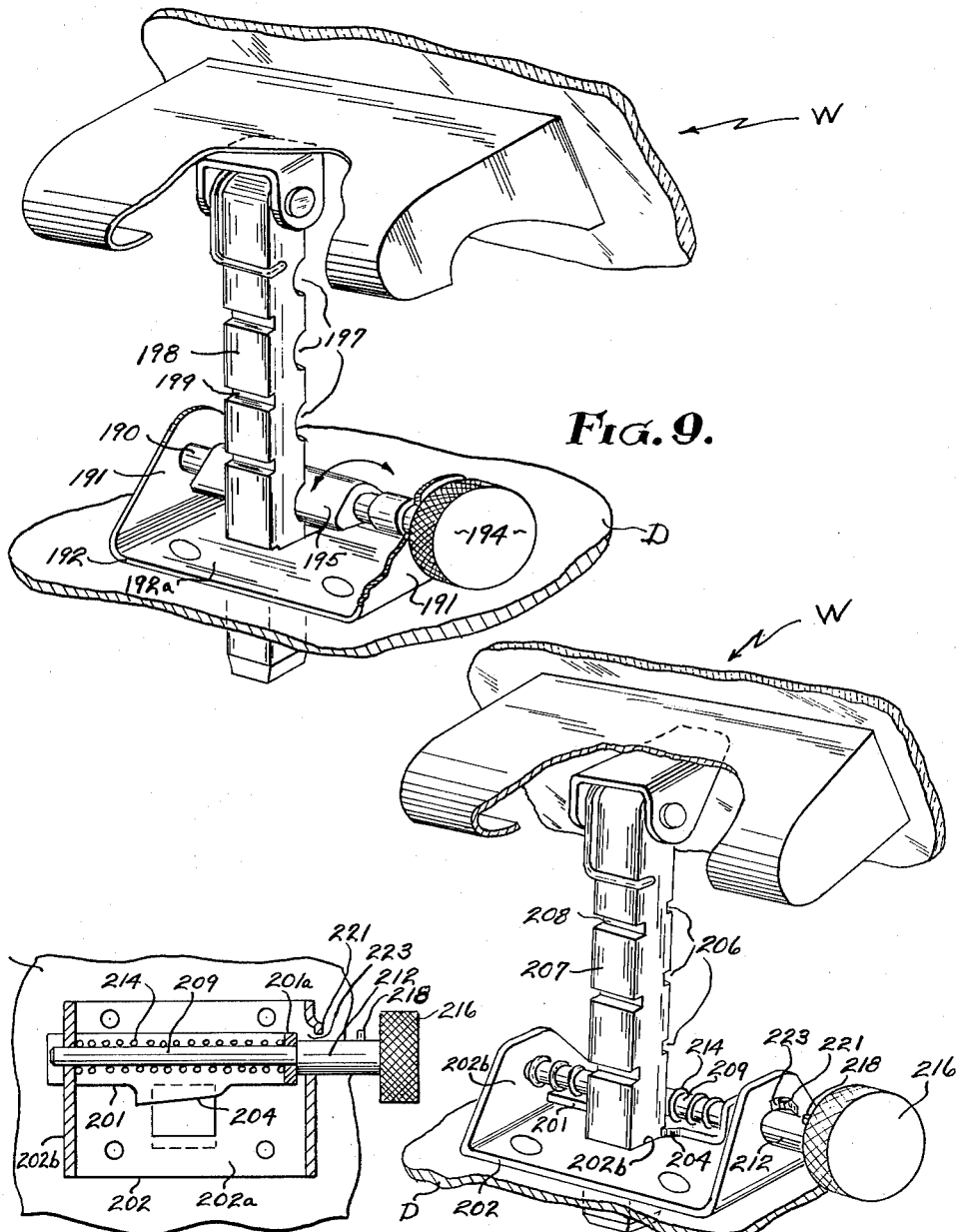

3,093,846
WINDSHIELD OPERATING MECHANISM
James S. Reid, Hudson, Ohio, assignor to The Standard Products Company, Cleveland, Ohio, a corporation of Ohio
Filed Mar. 28, 1961, Ser. No. 98,961
2 Claims. (Cl. 9—1)

This invention relates to new and improved windshield operating mechanism especially designed for use with vehicle windshield assemblies and the like, and has particular utility for use with a marine vehicle windshield that is intended to be adjusted and releasably locked in any predetermined adjusted position within a wide range of adjustment.

A primary object of the present invention is the provision of a new and improved windshield operating mechanism especially designed for use with a windshield of a marine vehicle, or the like wherein said windshield is mounted to the deck of the vehicle forwardly thereon relative to the vehicle cockpit, the windshield adjusting mechanism of the present invention being intended to be operable so as to locate said windshield in any preselected adjusted position above the aforesaid vehicle deck within a wide range of adjustment.

Another object of the present invention is the provision of a new and improved windshield operating mechanism especially designed for use with a marine vehicle or the like, wherein the windshield is pivotally mounted to the vehicle deck in a wind shielding location relative to the vehicle cockpit, the windshield operating mechanism being intended to be operable so as to locate said windshield in any preselected adjusted position about its pivotal connection above the vehicle deck within a wide range of adjustment.

Still another object of the present invention is the provision of a new and improved windshield operating mechanism especially designed for use with a marine vehicle or the like, wherein the windshield for said vehicle is pivotally mounted to the deck thereof forwardly of the vehicle cockpit and swingably movable to a closed-windshielding position wherein its bottom longitudinal edge is in substantial sealing relation with the aforementioned deck, the instant windshield operating mechanism being intended to be operable so as to locate said windshield in any preselected adjusted position about its pivotal connection within a range of adjustment above said deck to thereby enable direct access between said cockpit and deck and to likewise permit passage of air therepast and directly into said vehicle cockpit.

Additional objects and advantages of the windshield operating mechanism of the present invention will be readily apparent to one skilled in the art to which it pertains and upon reference to the following disclosure of several preferred embodiments thereof, and which are illustrated in the accompanying drawings wherein:

FIG. 3 is a fragmentary vertical sectional view of the windshield operating mechanism of FIG. 2 being shown in several of its adjusted positions;

FIG. 4 is a horizontal sectional view taken along the plane as is indicated approximately by the line 4—4 in FIG. 3;

FIG. 5 is a vertical sectional view of a second embodiment of windshield operating mechanism embodying the present invention;

FIG. 6 is a fragmentary perspective view of a third embodiment of windshield operating mechanism;

FIG. 9 is yet another embodiment of windshield operating mechanism embodying the concepts of the present invention; and FIGS. 10 and 11, respectively, are a horizontal sectional view and a front perspective view of still another embodiment of windshield operating mechanism.

Figure 1:
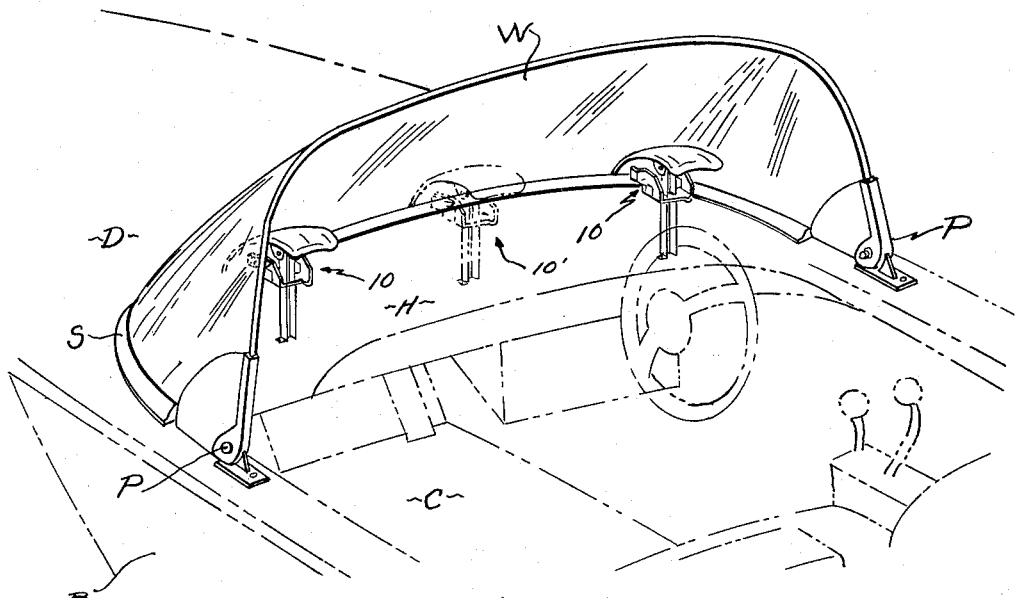
FIG. 1 is a fragmentary perspective view of a marine vehicle having a windshield swingably mounted to its deck forwardly of the vehicle cockpit, said windshield being adjustable relative to the aforesaid vehicle deck by windshield operating mechanism embodying the present invention.

Briefly, the windshield operating mechanism of the present invention, as is herein disclosed in several of its preferred embodiments, is especially designed for use with a windshield W of a marine vehicle or the like as is seen in FIG. 1, said vehicle being herein identified in its disclosed form by the reference character B, and wherein the windshield W is intended to be pivotally secured at its opposed ends by suitable pivotal connections P to opposite sides of the vehicle deck D, said windshield extending forwardly from the aforementioned pivotal connections therefor so as to extend in front of and across the cockpit of said vehicle.

The windshield W is intended to be swingably moved about its pivotal connection P to any one of a plurality of adjusted positions within a substantially wide range of adjustment, as is aforementioned, said windshield in its closed position being disposed so as to locate a seal strip S carried on its bottom peripheral edge in sealing relation with the boat deck D and/or in any of said adjusted positions wherein said windshield edge is spaced upwardly of said deck D.

With reference now directed to FIGS. 1 to 4 inclusive, one embodiment of windshield adjusting mechanism is herein disclosed, and as best seen in FIG. 1, at least one pair of said mechanisms is preferably utilized with the vehicle windshield W, each of said mechanisms being identified in its entirety by the reference numeral 10, each mechanism, in addition, being spaced one from the other along the forward bulkhead of the cockpit C. If desired one or more additional adjusting mechanisms may be utilized, for example as is indicated by the mechanism 10' centrally disposed between the aforesaid pair and interconnected to the central portion of the aforesaid windshield and the edge of the deck defining the forward cockpit bulkhead.

The instant embodiment of windshield operating mechanism is seen to include a housing 12 which is substantially U-shaped in configuration comprising a base wall 13 preferably of rectangular shape and which is integrally formed on each end thereof with an upstanding side wall 14. Said base plate is intended to be securely fastened by any suitable means not herein shown, to the deck D of the vehicle defining the upper edge of the forward cockpit bulkhead H in such manner so as to project horizontally rearwardly therefrom and into the forward portion of the cockpit C.

Figure 2:
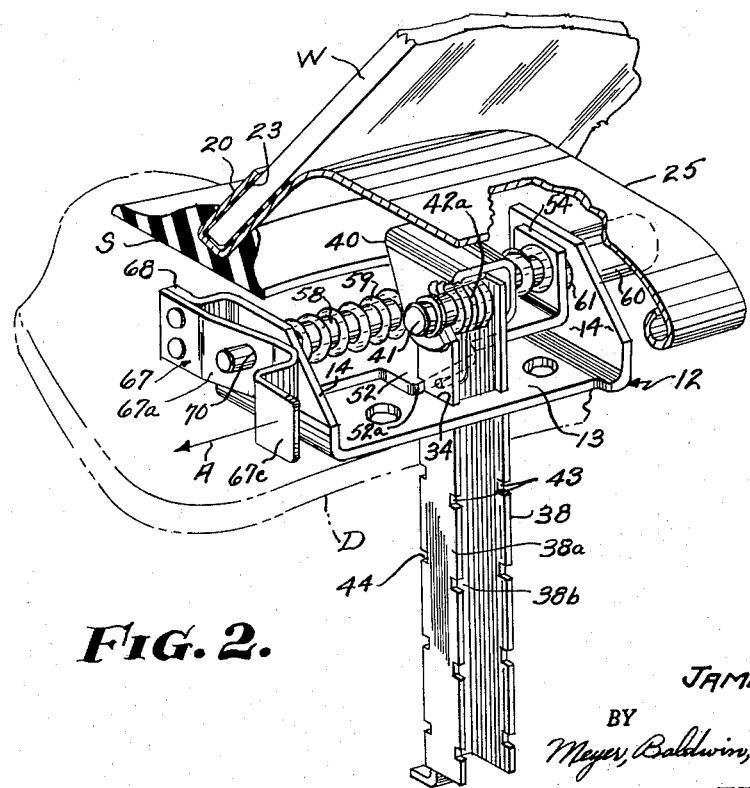
FIG. 2 is a fragmentary perspective view of the embodiment of windshield operating mechanism shown in FIG. 1, with exterior parts thereof being somewhat enlarged and cut away to more clearly show its interior construction.

The configuration of windshield W herein shown in FIGS. 1 and 2, is merely illustrative of one embodiment for which the instant windshield operating mechanism is particularly applicable and is not intended to define structural limitations for said mechanism. In its present form, the windshield is seen to mount the aforementioned seal strip S on its bottom peripheral edge, said seal being formed of any suitable flexible material such as rubber.

Each of the windshield adjusting mechanisms includes a bracket member 20 which has its one end extended around the bottom peripheral windshield edge, said one end being preferably spaced from the windshield by means of gasket 23, the latter and said bracket being suitably bonded to said edge.

The bracket member 20 includes a handle 25 which projects rearwardly therefrom and into the aforesaid cockpit C, being thus intended to be disposed so as to be readily available to the occupant therein and to thereby provide for the manual adjustment to the said windshield W in a manner as will be presently described.

As best seen in FIGS. 2 and 4, the base plate 13 of the housing 12 is provided with an aperture 34 of substantially square configuration and which is intended to freely accommodate a rack element 38.

The rack element 38 is seen to pivotally mount a bracket 40 on its upper end by means of pin 41, said bracket, in turn, being securely fastened by any suitable means such as welding or the like to the underside of the aforementioned adjustment handle 25, said racket 38 being thus swingably attached to the latter.

A spring 42a mounted on the pin 41 is effective to bias the rack element 38 in a counterclockwise direction, as viewed in FIG. 2, and into engagement with the base plate 13.

Upon swinging the windshield W about its pivotable mountings P, the rack element 38 is moved through the aforementioned aperture 34 in the base plate 13 in a corresponding direction, said rack element being intended to be releasably engageable and interlocked with said base wall and thus capable of locking said windshield into any preselected adjusted position within a substantially wide range of adjustment therefor.

For this purpose, as may be best seen in FIG. 2, the rack element 38 is preferably of channel-like configuration having a pair of side walls 38a integrally formed with a base wall 38b, said side walls preferably extending substantially perpendicularly outwardly from the latter so as to be disposed in substantial parallel spaced relation one to the other. A plurality of slots 43 is seen to be formed on the free edge of each of the aforesaid side walls 38a, said slots being preferably equally spaced one to the other, and located substantially directly opposite a companion slot on the opposite side wall to thus define a plurality of pairs of slots equally spaced one to the other longitudinally along said rack.

In like manner, a plurality of grooves 44 are formed on the opposite face of the rack 38 each of said grooves preferably piercing the base wall 38b thereof and disposed directly opposite one of the pairs of aforesaid spaced slots 43.

The windshield W as shown in dotted lines in FIG. 3 has been raised to one of its preselected adjusted positions relative to the deck D of the vehicle whereby the rack 38 is likewise raised upwardly within the aforementioned aperture 34 in the base wall 13 of the housing 12 so as to locate the slots 43 of one of the aforesaid spaced pairs in position as to receive and engage with the marginal edge of said base wall defining one side of said aperture. In this manner, the windshield W is positioned and retained in said adjusted position above the aforesaid vehicle deck D.

Means are provided in the instant assembly to releasably lock said windshield in its adjusted position, and for this purpose, a locking plate 50 which is preferably L-shaped in side elevation, is seen to have its one leg 51 integrally formed with a lock element 52, said element extending outwardly from one side thereof in substantial co-planar relation thereto. The leg 51 of said locking plate 50 is placed upon the upper surface of the housing base 13 in such manner that the lock element 52 faces the base 38b of the rack element 38 and hence the grooves 44 formed on the latter. The remaining upstanding leg part 54 of the locking plate 50 is thus disposed adjacent one side wall 14 of said housing 12.

With the windshield W adjusted in the manner as above described to one of its adjusted positions such as is shown in FIG. 3 wherein rack 38 is in interlocking engagement with the housing base wall 13, the locking plate 50 is intended to be disposed so as to locate its lock element 52 within the groove 44 directly opposite the pair of slots 43 accommodating said marginal edge of the aforementioned housing base to thereby lock or latch said rack in said adjusted position. For this purpose, a rod 58 is seen to be slidably supported between the leg part 54 of the locking plate 50 and the side wall 14 of the housing on the opposite end thereof, thus extending across the housing 12 above said base plate 13. A suitable coil spring 59 is disposed on said rod between said opposite side wall of the housing 12 and, said upstanding leg 54 of the locking plate 50, said spring being thus operable to normally bias said locking plate 50 toward the right, as viewed in FIG. 2, whereby its lock element 52 is in position so as to enter said groove 44 at said adjusted position for said windshield whereby the rack 38 is thus locked or latched in said adjusted position.

As best seen in FIG. 2, the longitudinal edge of the lock element 52 is inclined inwardly from an apex part 52a toward its opposite transverse edge located adjacent the upstanding leg part 54 of said locking plate 50. With this configuration, it will be seen that as the locking plate 50 tends to be moved to the right under the force of the coil spring 59, the apex part 52a of said lock element 52 is also carried toward the rack 38 to thereby provide a larger portion of said lock element to be disposed within the groove 44 at said adjusted position, and hence result in an increase in the interlocking relation therebetween.

The locking plate 50 is likewise intended to be capable of movement from its locked position as seen in FIG. 2, toward the left along the housing base wall 13 to thus carry the lock element 52 thereof out of interlocked or latched engagement with the aforesaid accommodating groove 44 to thereby permit a subsequent adjustment to be made to said windshield W.

For this purpose, the end of the rod 58 extending outwardly of the leg part 54 of the locking plate 50 is seen to be integrally formed with an enlarged cylindrical button 60, defining an annular shoulder 61 therebetween, said button projecting outwardly through an aperture 62 formed in the adjacent side wall 14 of the housing 12, in substantial longitudinal prolongation to said rod, and extending somewhat beyond one side edge of the overhanging handle 25 and thus in position to be readily depressed by the operator adjusting the said windshield. With this assembly, it is intended that upon pushing the button 60 and attached rod 58 to the left as viewed in FIG. 2 the aforesaid shoulder 61 will first engage the adjoining surface of the leg 54 of the locking plate 50 and upon subsequent continued movement of said button, said locking plate 50 will be slidably moved to the left along said housing base wall 13 against the progressively increasing pressure of the coil spring 59 so as to carry the lock element 52 thereof out of said accommodating groove 44. Thereafter, the rack may be swung about its pivot 41 so as to disengage the slots 43 from said housing base wall 13 to thereby permit said windshield to be subsequently moved to still another of its adjusted positions.

The instant embodiment of windshield operating mechanism 10 is also provided with means to lock the rod 58 and locking plate 50 in an unlatched position relative to the accommodating rack groove 44 preferably during the interval the windshield W is being moved to another adjusted position, and for this purpose a lever 67 formed of a suitable flexible material such as spring steel is seen to have its one end securely fastened to an abutment 68 formed on the housing side wall 14 remote from the leg part 54 of the locking plate and in such manner as to extend over and adjacent the outer surface of the latter. As best seen in FIG. 4, the lever 67 is provided with an intermediate part 67a having an aperture 70 which is slightly larger in diameter than the diameter of the rod 58, said aperture being located so as to permit said rod to be passed therethrough.

In its normal "locking" position, the intermediate portion 67a of the lever 67 is seen to extend annularly inwardly from the aforesaid abutment 68 toward the adjacent outer surface of the housing side wall 14, the rod 58 projecting through said aperture 70, whereby the marginal edge of the latter frictionally engages said rod. With this assembly, it is intended that during the movement of the rod 58 and locking plate 50 to the "unlatched" position therefor as above defined, when the lock element 52 is being moved out of latching engagement with the accommodating rack groove 44, preparatory to adjusting the windshield W to another position, the lever is swung outwardly from the housing 12 so that its intermediate part is approximately in the position as is indicated in dotted lines in FIG. 4.

During this interval of movement for said lever the frictional relationship between the same and the rod 58 is gradually decreased as will be understood, said rod continuing to pass into and through the lever aperture, and to thereby permit the locking plate 50 to be moved to its "unlatched" position.

When said locking plate 50 is moved to its aforesaid "unlatched" position, the operator may then release the button 60 and attached rod 58, and the lever 67 will immediately return to its normal "locking" position which is effective to hold said rod and locking plate 50 in said "unlatched" position while the windshield W is re-adjusted.

Thereafter, with the windshield W in its newly adjusted position, the handle part 67c of the lever 67, which is seen to be integrally formed on the end of the intermediate lever part 67a, may then be pulled outwardly from the housing 12 or in the direction of the arrow A in FIG. 2 effective to swing said lever clockwise to thereby release the rod 58 and to permit the locking plate 50 to be returned by spring 59 to its "latching" position effective to dispose the lock element 52 thereof in one of the rack grooves 44 and hence latch the said rack and attached windshield in its newly adjusted position. After the locking plate 50 is fully returned to said "latched" position, the lever 67 may then be permitted to return to its normal "lock" position as is shown in FIG. 4 which is then effective to retain said rod 58 and locking plate 50 in said "latched" position.

In FIG. 5 of the drawings, I have herein disclosed a second embodiment of windshield operating mechanism which includes a bracket 102 attached to the bottom peripheral windshield edge and which is provided with a substantially flat base plate 103, the latter being disposed closely adjacent the inner face of the aforesaid windshield W, and which, on its upper end is seen to mount an externally threaded bolt 105, said bolt projecting substantially perpendicularly outwardly from said surface and toward the cockpit C of the marine vehicle. A bracket, as is identified in its entirety by the reference numeral 107, is seen to be provided with a base leg 108 which is securely fastened to the deck D of the marine vehicle closely adjacent and rearwardly of the windshield W. Said bracket is provided with a substantially vertically upwardly extending medial part 108a which is integrally formed on its upper end with an angularly extending part 109, the latter projecting preferably upwardly from said medial part in substantially parallel spaced relation to the windshield W with the latter in its closed position.

The aforesaid angular part 109 of the bracket 107 is preferably centrally provided with an elongated opening 112 projecting longitudinally therealong and which is adapted to freely accommodate the shank 105a of the aforesaid bolt 105.

A plurality of spaced notches 113 is formed on said bracket part 109 on either side of the opening 112, said notches being preferably disposed in opposed pairs transversely of said opening.

A lock plate 114 is seen to be freely extendable over the shank 105a and has a pair of projections 115 formed thereon and which are adapted to be accommodated within one of the said pairs of notches 112.

An adjustment knob 116 is seen to be threadably mounted on the end of the bolt shank 105a and is intended to be adjusted thereon so as to engage the underlying lock plate 114 effective to press the latter firmly against the bracket part 109, said bracket part being thus, in turn, pressed against the head of the bolt 105, the result being to securely fasten the aforesaid frame 102 and windshield W in one of its adjusted positions to the said bracket 107.

A suitable coil spring as is indicated at 118, is disposed over the bolt shank 105a, extending through the opening 112 in the bracket part 109 and engaging the adjoining surfaces of the bolt head and the lock plate 114, being thus operable to normally force said elements apart and thereby requiring that the force exerted on the lock plate 114 by said knob must be greater than the tensive force exerted by said spring in order for said lock plate to be moved into interlocking engagement with the underlying bracket part 109.

With this assembly, it will now be realized that upon loosening the adjustment knob 116, so as to release the locking plate 114, the windshield W may thereafter be swung upwardly about its pivotal supports from its closed position as is shown in FIG. 5, thus carrying the frame 102 and bolt shank 105a longitudinally through the bracket opening 112 to a newly adjusted position whereafter said knob may then be tightened upon said shank to thereby locate the lock plate 114 and projections 115 formed thereon into another of said transversely spaced pairs of opposed notches 112 on said bracket part 109 to thereby interlock said windshield W in said newly adjusted position to the aforesaid bracket 107.

In FIG. 6 is herein shown another embodiment of windshield operating mechanism especially adapted for use with the windshield W of the aforementioned marine vehicle B, and is seen to include a lever 130 pivotally anchored at its one end by pin 131 to an upstanding arm 132 of a bracket 133. Said bracket, in turn, is intended to be mounted to the vehicle deck D rearwardly of the windshield W. Said lever is seen to be provided with an elongated opening 135 spaced from its pivoted end and which is seen to freely accommodate one end of an externally threaded stud 138, the head 138a of the latter being suitably anchored to a plate 139 carried on said windshield W. A suitable fastener such as a wing nut 140 threaded on said stud 138 is intended to press said lever firmly against the head 138a of said stud being thus operable to resiliently retain said lever in an adjusted position.

Figure 7:
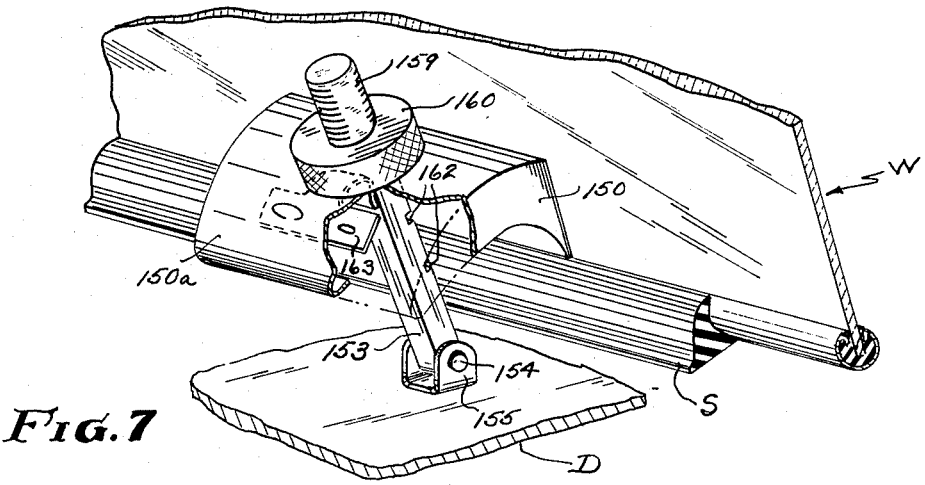
FIG. 7 is a fragmentary front perspective view of a fourth embodiment of windshield operating mechanism embodying the present invention.

In FIG. 7, another embodiment of windshield operating mechanism is herein disclosed, and which is seen to include a handle as is indicated at 150 which is preferably bonded or otherwise attached directly to the windshield W above its seal strip S, said handle having a rearwardly extending hand gripping part 105a.

A rack element as is indicated at 153 is seen to have its one end swingably mounted by pin 154 to a bracket 155 anchored to the boat deck D so as to be swingable about an axis that is approximately parallel with the plane of the windshield disposed directly forwardly thereof.

The rack element 153 is intended to be extended through a suitable aperture formed in the hand gripping part 150a of the aforementioned handle 150, the free end of said element being preferably externally threaded as is indicated at 159 and which is intended to threadably accommodate a lock nut 160 thereon.

The rack element is provided with a series of spaced grooves 162, each of said grooves being of such dimension as to readily accommodate the hand gripping part 150a defining the forward edge of the aforementioned aperture therein, being thus effective to latch said components together.

With the windshield assembly moved to one of its adjusted positions, as is hereinabove defined, one of the aforementioned grooves 162 in the rack element 153 is in latching engagement with the hand gripping part 150a of said handle and the lock nut 160 may then be threaded onto the latter sufficiently to bring it into pressure engagement with the upper surface of said hand gripping part 150a so as to retain said components in said latching relation.

A suitable spring element as is indicated at 163 may be attached to the underside of the handle part 150a so as to resiliently bear against the side of the rack element opposite the spaced grooves 162 and which, as will be apparent, is effective to bias said rack element into positive engagement with the aforementioned handle part 150a defining one edge of said aperture.

Figure 8:
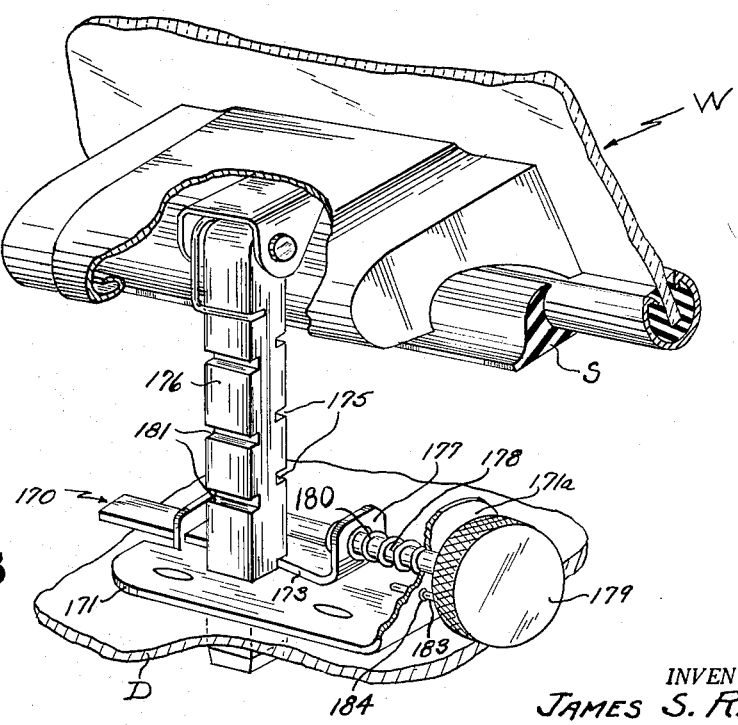
FIG. 8 is likewise a fragmentary front perspective view of still another embodiment of windshield operating mechanism.

In FIGS. 8, 9 and 11 I herein disclose several additional embodiments of windshield operating mechanism, each of which is somewhat similar to the previous embodiment herein disclosed in FIG. 1, and which differ from the latter by utilizing modified latch means to releasably latch the windshield assembly in any of its aforementioned adjusted positions.

With specific reference now directed to FIG. 8, the modified latch means herein disclosed includes a locking plate 170 which is slidably mounted within a bracket 171, the latter being securely fastened to the deck D, said locking member 170 in turn, having a lock element 173 formed thereon and which is directed to be engageable with any one of a plurality of slots 175 formed in the rack element 176 and spaced longitudinally along one side thereof.

The locking plate 170 is seen to be provided with an upstanding end wall 177 upon which is mounted a shaft 178, the latter being attached preferably centrally thereon so as to be rotatable relative to said end wall and likewise to extend outwardly from said plate in substantial longitudinal prolongation to the same and through a suitable aperture formed in the end wall 171a of the bracket 171, said shaft at its free end mounting a knob 179.

A coil spring 180 is seen to be mounted over said shaft 178 and interposed between the adjoining surfaces of the upstanding wall 177 of the locking plate 170 and the inner face of the bracket wall 171a, said spring being thereby effective to normally bias said locking plate 170 to the left as viewed in FIG. 8, whereby its lock element 173 is intended to be disposed within one of the aforementioned slots 175 formed in the rack element 176. Said rack element is likewise provided with a series of grooves 181 on the side opposite the slots 175, each of said grooves being spaced therealong so that it is opposite one of said slots 175 with the windshield assembly disposed in a preselected adjusted position as is herein disclosed in FIG. 8, wherein the lock element 173 is in latching relation with one of the rack slots 175, the knob 179 may be pulled to the right to slidably move the locking plate 170 effectively to remove the lock element 173 from engagement with said one slot whereby the windshield assembly W may thereafter be repositioned to still another of its adjusted positions.

Means are also provided in the instant windshield operating mechanism to retain the locking plate 170 in an unlatched position.

For this purpose, a pin 183 has its one end anchored to the inner face of the knob 179, and extending from the latter inwardly toward the bracket side wall 171a, said wall having an aperture 184 formed therein which is adapted to readily slidably accommodate said pin. As seen herein in FIG. 8, the pin 183 is preferably disposed in parallel spaced relation to the aforementioned shaft 178.

With the assembly, and assuming that it is desired to retain the locking plate 170 in its unlatched position, the knob 179 is pulled to the right so as to release the rack element 176 from latching engagement with the lock element 173, said knob being pulled a distance sufficiently to carry the pin 183 out of its accommodating aperture 182. When this occurs, the knob may then be slightly rotated so as to carry the pin 181 away from said aperture. Said knob may then be released whereby the free end of the pin 183 will engage the outside face of the bracket wall 171a thereby preventing further inward movement of the locking plate 170 in its "locking" direction of movement.

In this manner, the lock element 173 of said plate is retained in a remote or "unlatched" position relative to the rack 176 to thereby enable the windshield assembly to be swung to another of its adjusted positions and/or swung free of the latching assembly.

The modified latch means as is disclosed in FIG. 9 comprises a shaft 190 rotatably supported between the upstanding end walls 191 of bracket 192, the latter being securely fastened to the boat deck D.

A control knob 194 is mounted on one end of the aforesaid shaft 190 projecting outwardly from one of the side walls 191 of said bracket, being thereby readily accessible to the operator.

A cam element as is indicated in its entirety by the reference numeral 195 is carried on said shaft 190, and is adapted to be selectively disposed within one of a plurality of grooves 197 formed on one side of the rack element 198 and which are disposed in longitudinal spaced relation therealong. Slots 199 formed on the opposite side of the rack element 198 are each directly opposite one of said grooves 197.

With this assembly, the windshield assembly W may be selectively positioned in the manner as is above described so as to locate one of the aforesaid grooves 197 opposite the cam element 195 on the shaft 190, and the latter may then be rotated in a counterclockwise direction sufficiently to move the aforementioned cam element 195 into said groove, the dimensions of said cooperating elements thereof being such as to cam or swing the rack clockwise as seen in FIG. 9 so as to bring the slot 199 opposite the accommodating groove into latching engagement with the base 192a to thereby position said windshield assembly in one of its said adjusted positions.

If it is desired to readjust the windshield assembly about its pivotal deck connections, the shaft 190 may be rotated in a clockwise direction sufficiently to remove the cam element 195 from its accommodating rack element groove 197 enabling the rack element 198 to be unlatched from the housing base 192a after which said assembly may be swung to its newly adjusted position.

With reference now directed to FIGS. 10 and 11, the modified form of latch means herein disclosed is seen to include a locking plate 201 which is slidably mounted within bracket 202, said plate having a lock element 204 formed thereon and which is adapted to be disposed within any one of a plurality of locking grooves 206 formed on the adjacent face of the rack element 207.

The opposite face of the rack element is provided with a plurality of slots 208, each of which is opposite one of said locking grooves 206. With the windshield assembly swung to an adjusted position therefor, one of said slots 208 is intended to receive bracket base 202a defining one edge of the aperture 202b. In this position, the locking plate 201 is intended to be located in its locking position as is shown in FIG. 10 wherein the lock element 204 is in latching engagement with the groove 206 opposite the receiving slot.

The locking plate 201 is likewise intended to be capable of movement from its aforesaid "locked" position toward the left along the bracket base wall 202a to thus carry the lock element 204 thereon out of latched engagement with the locking groove opposite thereto.

For this purpose, a shaft as is indicated at 209 is mounted within the upstanding end walls 202b of the bracket 202, said locking plate 201 having an upstanding arm 201a through which said shaft likewise extends.

A sleeve 212 is mounted over the shaft 209, said sleeve having its one end abutting the outside face of the upstanding arm 201a of said locking plate, said sleeve extending outwardly therefrom and through an opening formed in the adjacent bracket side wall 202b, its opposite end mounting a suitable knob 216.

A coil spring as is indicated at 214, is mounted on the shaft 209 being interposed between the inner face of the aforesaid wall 201a of the locking plate 201 and the adjoining face of the opposite end wall 202b disposed at the left of the bracket 202, as viewed in FIG. 10, being thus effective to normally bias the locking plate 201 to the right and locate the lock element 204 normally within the rack groove 206 aligned therewith.

From this "locking" position, the shaft 209 is intended to be slidably moved from right to left as viewed in FIG. 10 by pressing against knob 216 sufficiently to disengage the lock element 204 from its accommodating rack groove 206 and unlatch the rack element 207 from the base 202a of the bracket 202 whereby the windshield assembly may thereafter be adjusted to another of its positions.

Means are also provided in the instant operating mechanism to retain the locking plate 201 in its unlatched position.

To accomplish this, a lug as is indicated at 218, is attached to the aforesaid sleeve 212 so as to project preferably radially outwardly of the shaft 209, said lug being preferably spaced on said sleeve inwardly from the knob 216.

A tab or keeper 221 is preferably struck from the adjacent bracket end wall 202b, said tab projecting outwardly therefrom so as to define an opening 223 between the latter and the adjacent surface of said end wall.

With this construction, sufficient pressure is applied to the knob 216 effectively to slide the locking plate 201 to the left and disengage the lock element 202 from its accommodating rack groove 206 in the manner as is aforementioned, said knob 216 being closely adjacent said end wall, and which may then be rotated so as to carry the lug 218 into the aforementioned opening 223 and behind the tab 221. Upon releasing the knob 216, the lug 218 is retained in said opening, being urged against the inner surface of the keeper 221 by the aforesaid spring 214 to thereby retain the locking plate 201 and its lock element 204 in the "unlatched" position therefor whereby the windshield assembly may be subsequently moved to any one of its adjustable positions.

Thereafter, the knob 216 may be rotated in a counterclockwise direction as is viewed in FIG. 11 sufficiently to remove the lug 218 from the aforementioned opening 223, whereafter, under the influence of the spring 214, the locking plate 201 is urged to the right to thereby carry its lock element 204 into the rack groove 206 aligned therewith effectively to releasably latch the rack element 207 to the housing base 202a and thus retain the windshield assembly in its adjusted position.

Having thus described several preferred embodiments of windshield operating mechanism of the present invention, it is to be understood that the same is susceptible to various modifications, variations, and arrangements of parts without departing from the inventive concepts of the same as are defined in the claims.

What is claimed is:

1. In combination, a windshield and means pivotally mounting said windshield to a vehicle body, operating mechanism for swingably adjusting said windshield about said pivotal means, comprising adjustment means including a rack pivotally attached at one end to said windshield, bracket means carried on said body, means for selectively moving said rack to a plurality of predetermined adjusted positions relative to said bracket means effective to swing said windshield about said pivotal means, a plurality of latching means spaced along one longitudinal surface of said rack, one of said latching means being disposed to latchably engage said bracket means in each of said adjusted positions for said rack, spring means carried on said windshield being in engagement with said rack effective to urge said rack toward said bracket means, a plurality of locking grooves spaced along a second longitudinal surface of said rack, lock means comprising a lock bolt slidably mounted in said bracket means, a lock element carried on said bolt, said lock bolt being slidably actuatable to carry said lock element into locking engagement with one of said locking grooves in each of said adjusted positions for said rack, and spring means urging said lock element into said locking relation with each said locking groove.

2. In a windshield assembly as is defined in claim 1 and which is further characterized by having means for releasably retaining said lock means in an unlocked position relative to said locking grooves to permit said rack to be moved to another adjusted position.

References Cited in the file of this patent

UNITED STATES PATENTS

| 1,615,035 | Rasmussen | Jan. 18, 1927 |
| 1,936,513 | Klauer | Nov. 21, 1933 |
| 3,021,535 | Dorst | Feb. 20, 1962 |

FOREIGN PATENTS

| 473,875 | Great Britain | Oct. 21, 1937 |